United States Patent [19]

Ackman et al.

[11] Patent Number: 4,695,378

[45] Date of Patent: Sep. 22, 1987

[54] ACID MINE WATER AERATION AND TREATMENT SYSTEM

[75] Inventors: Terry E. Ackman, Finleyville; John M. Place, Bethel Park, both of Pa.

[73] Assignee: The United States of America as represented by the Secretary of the Interior, Washington, D.C.

[21] Appl. No.: 669,155

[22] Filed: Nov. 7, 1984

[51] Int. Cl.$^4$ ............................ C02F 1/66; C02F 1/72
[52] U.S. Cl. .................... 210/198.1; 210/253; 210/738; 210/722; 261/DIG. 75
[58] Field of Search ............ 210/198.1, 202, 199, 210/710-713, 721, 722, 253, 743, 749, 738, 219; 261/DIG. 72, DIG. 75, 76, 79 A; 366/339, 102

[56] References Cited

PUBLICATIONS

Bureau of Mines Report of Investigations (RI) 8868; "In-Line Aeration and Treatment of Acid Mine Drainage" by Ackman T. E. et al., May 15, 1984.

Primary Examiner—Benoît Castel
Attorney, Agent, or Firm—Thomas Zack; E. Philip Koltos

[57] ABSTRACT

An in-line system is provided for treating acid mine drainage which basically comprises the combination of a jet pump (or pumps) and a static mixer. The jet pump entrains air into the acid waste water using a Venturi effect so as to provide aeration of the waste water while further aeration is provided by the helical vanes of the static mixer. A neutralizing agent is injected into the suction chamber of the jet pump and the static mixer is formed by plural sections offset by 90 degrees.

5 Claims, 4 Drawing Figures

4,695,378

ACID MINE WATER AERATION AND TREATMENT SYSTEM

FIELD OF THE INVENTION

The present invention relates to an acid mine water aeration and treatment system for aerating and neutralizing polluted water.

BACKGROUND OF THE INVENTION

Acid mine drainage (AMD) results from the exposure and subsequent oxidation of sulfide minerals, primarily pyrite, during the mining of coal and various metal sulfide ores. The acidic reaction products are dissolved by infiltrating rainwater, eventually emerging in acid seeps or springs. While many factors influence the quantity and quality of water handled by a mining operation, it is not unusual for a single mine to treat one million gallons of acid water a day. The costs of such treatment range up to $500,000 per year, with the entire industry perhaps spending over $1 million per day.

Conventional AMD treatment processes basically comprise four steps: (1) neutralization, (2) aeration, (3) settling and disposal of sludge, and (4) effluent discharge. The neutralization and aeration steps in conventional treatment processes are separate discrete steps and, in any medium to large scale operation, necessitate equipment that requires an on site electrical power source and periodic maintenance. In addition, capital costs are high, particularly if the site is remote and power lines must be run to the site. Each step also requires a special construction to carry that step out, e.g., neutralization usually requires some type of erected structure for the storage and liquifaction of neutralizing material, and aeration generally requires either a surface erected structure or an excavation for an aeration basin and special supports for securing the mechanical aeration device in place. Typical capital costs for an AMD facility range between about $500,000 and $2 million. A discussion of commonly used, conventional processes can be found in a publication of the Environmental Protection Agency entitled "Design Manual: Neutralization of Acid Mine Drainage" (EPA-600/2-83-001, January 1983).

Aeration requirements vary, based upon iron concentrations and flow volume. Iron dissolved in the acidic water is often in the $Fe^{2+}$ state and must be oxidized to $Fe^{3+}$ before discharge so that it will hydrolyze and precipitate as $Fe(OH)_3$. Manganese, if present, must be also be oxidized and precipitated. The rate of the oxidation is a function of the dissolved oxygen and pH, and even if aerated, mine water contains only relatively small amounts of dissolved oxygen. To replenish the dissolved oxygen, settling ponds are made wide and shallow to maximize the diffusion of oxygen into the water. However, oxygen diffusion is relatively slow so that at many sites, supplementary aeration sources are necessary. For example, diffusion can be increased by increasing turbulence and is typically accomplished by incorporating a series of open-channel drops in the flow path of the water to produce such turbulence and thereby increase the dissolved oxygen concentration. As mentioned above, mechanical aerators are also used to continuously introduce bubbles of air into the water. However, this approach has a number of disadvantages including those outlined above, i.e., the requirement for a separate aeration tank, high initial capital costs, and high operating costs associated with power consumption and maintenance, especially where gypsum precipitation is a problem.

Patents of possible interest in this and related fields include U.S. Pat. Nos. 4,377,486 (Barrick et al); 4,329,224 (Kim); and 3,743,598 (Field).

SUMMARY OF THE INVENTION

In accordance with the present invention, an improved AMD system is provided which affords a number of advantages over the prior art. As explained in more detail below, these advantages include both greater efficiencies and lower costs. The system of the invention basically comprises an in-line combination of a jet pump (or pumps) and a static mixer. Preferably, a neutralizing reactant is injected at the jet pump or upstream thereof. The system is believed to be more efficient than conventional systems because the use of the reactant is optimized by the unique mixing actions provided by the jet pump and static mixer and because oxidation is more efficient due to the simultaneous aeration and neutralization which takes place.

Thus, according to a preferred embodiment thereof, the in-line aeration and treatment system of the invention comprises a jet pump, including an inlet connected to receive the acid mine water, for entraining air in the mine water by Venturi action, and a static mixer, connected to the discharge end of the jet pump and including a helical mixing element therein, for forcing the acid water discharged from the jet pump to follow a spiral path and to thereby provide aeration thereof. As mentioned above, means are preferably provided for injecting a neutralizing agent into the mine water upstream of the static mixer. Advantageously, the jet pump includes a suction chamber and means are provided for injecting a neutralizing agent into this suction chamber. The jet pump preferably includes an inlet nozzle and the suction chamber surrounds the discharge end of this inlet nozzle so that the neutralizing agent is injected in the vicinity of the discharge end of the nozzle.

The static mixer preferably comprises a plurality of similar sections rotated at an angle with respect to the adjacent sections in order to enhance mixing. More particularly, the helical elements of each section are preferably offset at an angle of 90 degrees with respect to the adjacent sections. A brief description of this invention has appeared in the February 1985 Technology News document No. 215 published by the U.S. Bureau of Mines. A more comprehensive report was previously made available to the public on May 15, 1984, in the Bureau of Mines Report of Investigations (RI) 8868 entitled "In-Line Aeration and Treatment of Acid Mine Drainage."

Other features and advantages of the invention will be set forth in, or apparent from the detailed description of a preferred embodiment which follows.

DESCRIPTION OF THE PREFERRED EMBODIMENTS

Figure 1:
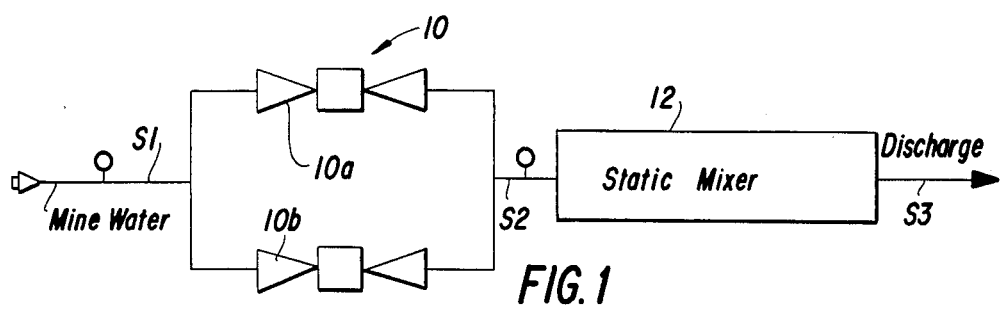
FIG. 1 is a schematic diagram, partially in block form, of the in-line acid mine water aeration and treatment system of the invention.

Referring to FIG. 1, the basic components of the invention are shown in a schematic format. As illustrated, the core elements of the aeration and treatment system of the invention are a jet pump assembly 10 and a static mixer 12, with a pair of parallel-connected jet pumps 10a and 10b making up the jet pump assembly 10 in the embodiment of FIG. 1. The jet pumps 10a, 10b are connected to receive the mine water through a typically four-inch inlet line marked "mine water" and containing a first sampling point S1 and are connected to static mixer 12 through a connecting line containing a second sampling point S2. Discharge takes place through an outlet line marked "discharge" and containing a third sampling point S3. Sampling points S1, S2 and S3 are thus provided for the raw water, the jet pump outlet and the static mixer outlet, respectively.

Figure 2:
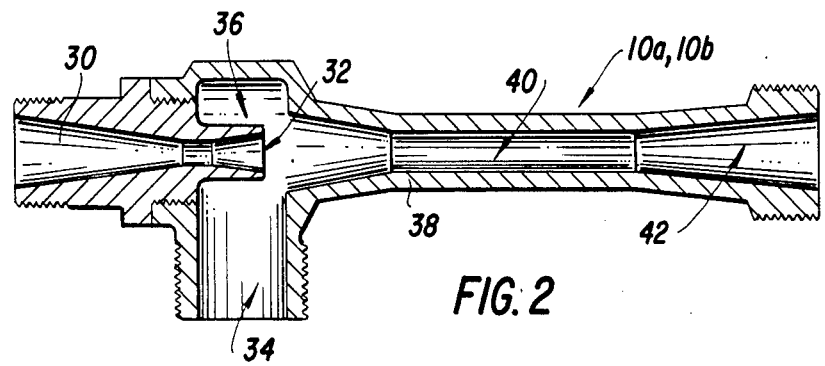
FIG. 2 is a longitudinal cross sectional view of one of the jet pumps of FIG. 1.

The jet pumps are conventional "off-the-shelf" components and a suitable jet pump is described, for example, in Gosline, J. E. and M. P. O'Brien, "The Water Jet Pump", Univ. Calif., Publ. Eng., v.3, No.3, 1942, pp.167–190. Jet pumps are basically nozzles which entrain air by Venturi action. As shown in FIG. 2, the jet pumps 10a, 10b comprise a shaped inlet passage 30, which terminates in a nozzle 32, and a suction inlet 34 in communication with a suction chamber 36. Nozzle 32 opens into chamber 36 and discharge takes place through an outlet passage 38 comprising an elongate parallel section 40 and a diffuser section 42. Water enters inlet 30 under pressure generated by the existing mine water discharge pump (not shown) and is converted by the jet pump into a high velocity stream. This stream exits from nozzle 32 through suction chamber 36 which is open to atmosphere at inlet 34. If the system is used for neutralization as well as aeration, as is the case in a preferred embodiment, the suction chamber 36 also serves as the injection point for the neutralizing material (e.g. lime, NaOH or potassium hydroxide (KOH), or finely ground limestone). Alternatively, the neutralizing material can be mechanically injected into the mine water line anywhere upstream of the aeration and treatment system.

Figure 3:
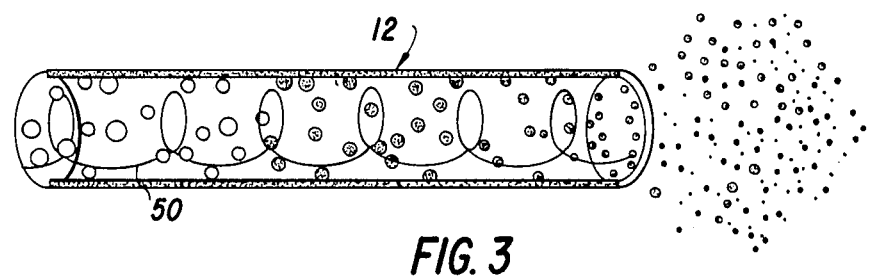
FIG. 3 is a schematic side elevational view of the static mixer of FIG. 1.
Figure 4:
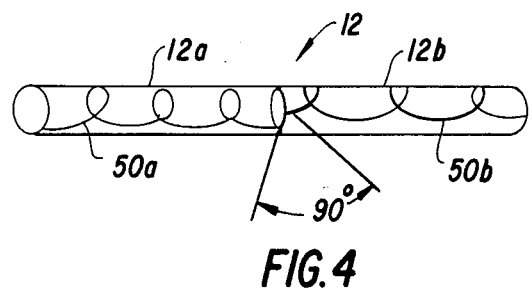
FIG. 4 is a schematic diagram of a static mixer formed by a pair of 90 degree offset mixer sections.

The water discharged from pumps 10a, 10b enters static mixer 12 which is also an "off-the-shelf" component and the basic construction of which is illustrated diagrammatically in FIG. 3. The static mixer 12 is preferably made up of one-foot sections of pipe (typically fabricated of copolymer polypropylene resins) laminated end to end with fiberglass. Inside each section is a one-foot helix, indicated schematically at 50, which forces the acid water to follow a spiral path as illustrated in FIG. 3. Such helical units are used routinely, when disposed vertically, in sewage and industrial waste water treatment plants as vertical airlift aeration and mixing units. In the embodiment of the invention, these units are modified for the present horizontal application, with each helical unit being rotationally offset by 90 degrees from its neighbor. This is indicated schematically in FIG. 4 wherein the helix 50b of pipe section 12b is offset by 90 degrees with respect to helix 50a of upstream pipe section 12a. This arrangement provides interruption of the corkscrew effect every foot and this enhances the mixing action. Eight one-foot sections were used in a specific exemplary embodiment, thereby providing a contact time equivalent to that of a 32-ft pipe.

Testing of the aeration and treatment system of the invention has shown a significant increase in oxidation rates above theoretical limits through the mixing and aeration action of the jet pumps 10a, 10b and static mixer 12. For example, at a pH of 5.5, oxidation rates were 10 times faster than anticipated while at a pH of 4.6, oxidation rates were over 400 times faster than anticipated. The rate of $Fe^{2+}$ oxidation is further accelerated by incorporating neutralization into the system. For example, when NaOH was injected into the injection (suction) port 34 of the jet pump, the simultaneous aeration and neutralization maximized the $Fe^{2+}$ oxidation reaction rates, with the result that almost all of the $Fe^{2+}$ was oxidized as the water flowed through the aeration and treatment system formed by pumps 10a, 10b and static mixer 12. In addition, manganese was removed, apparently coprecipitated with the iron. The extremely high rate of $Fe^{2+}$ oxidation can possibly be attributed to the extremely high instantaneous pH in a portion of the flow, which reduced the reaction half-time in that portion to a matter of microseconds.

The system of the invention is substantially more economical than conventional mixing and aeration devices. The cost in a specific example was about one-fifth of that of a conventional aerator and the maintenance costs are also much lower because of the absence of moving parts. The jet pumps 10a, 10b are made of polyvinyl chloride, a non-corroding and economical material, as are the other process components. Problems sometimes associated with the spray from a mechanical aerator should not be a problem with the present system, and gypsum scale, if developed, can be dislodged readily. In addition, space can be conserved in a new AMD plant, by designing ponds which are deeper than normal, since diffusion of oxygen into the ponds as described above is no longer essential.

Although the invention has been described relative to an examplary embodiment thereof, it will be understood by those skilled in the art that variations and modifications can be effected in this exemplary embodiment without departing from the scope and spirit of the invention.

We claim:

1. An in-line areation and treatment system for acid mine water having metallic components therein, said system having no moving parts and comprising:
    at least one jet pump capable of entraining air having no moving parts and which utilizes Venturi action to operate, each of said at least one jet pumps having a first inlet for receiving acid mine water having metallic components, a second inlet opened to atmosphere for receiving air to be entrained with the mine water, and a diffuser outlet section for discharging aerated treated mine water in a high velocity stream;
    and a static mixer fluidly connected to the outlet section of said at least one jet pump for receiving the aerated mine water, said mixer having an internal helical element therein to force the treated acid mine water from the at least one jet pump to flow through a helical path and out a discharge, thereby further assisting in the aeration thereof and the increasing of the oxidation rates for the metals present in the acid mine water.

2. A system as claimed in claim 1 wherein means are provided for injecting a neutralizing agent into the mine water at the second inlet of said at least one jet pump before it reaches said static mixer.

3. A system as claimed in claim 1 wherein said static mixer comprises a plurality of similar aligned joined sections whose internal helical elements are rotated at an angle with respect to the adjacent helical element where the sections are joined.

4. A system as claimed in claim 1 wherein said static mixer includes a plurality of substantially identical aligned joined sections with the helical elements of each section being offset from the adjacent helical element of another joined section by an angle of 90 degrees.

5. A system as claimed in claim 1 wherein said system comprises two jet pumps operatively connected in parallel to receive the acid mine water at their respective first inlets and to discharge the aerated mine water to the static mixer.

* * * * *